United States Patent [19]
Kindersley

[11] 3,985,150
[45] Oct. 12, 1976

[54] BALL VALVE FOR VALVING ABRASIVE FLUIDS

[75] Inventor: Peter G. Kindersley, Glen Falls, N.Y.

[73] Assignee: Kamyr Valves, Inc., Glens Falls, N.Y.

[22] Filed: June 3, 1975

[21] Appl. No.: 583,291

[52] U.S. Cl. .............................. 137/240; 137/375; 251/315
[51] Int. Cl.² ......................................... F16K 5/06
[58] Field of Search ............ 137/375, 240; 251/309, 251/314, 315

[56] References Cited
UNITED STATES PATENTS

| | | | |
|---|---|---|---|
| 867,780 | 10/1907 | Auchu | 137/375 |
| 885,526 | 4/1908 | Ruppel | 137/375 |
| 904,852 | 11/1908 | Dwyer | 137/375 |
| 925,809 | 6/1909 | Henss | 137/375 |
| 3,073,336 | 1/1963 | Johnson | 137/375 |
| 3,825,030 | 7/1974 | Kalsi | 137/375 |

Primary Examiner—Martin P. Schwadron
Assistant Examiner—Richard Gerard
Attorney, Agent, or Firm—Cushman, Darby & Cushman

[57] ABSTRACT

A valve assembly for valving abrasive fluids. A ball valve member is provided for rotation in a body member, the body member having inlet and outlet bores therein. Tubular inserts of abrasion resistant material - such as boron carbide - are provided in the inlet, outlet, and a bore through the valve member. The inserts are selected so that cooperating arcuate sections formed at the ends thereof are of a length greater than or equal to the diameter of the passageways through the inserts. Also the diameter of the passageways is preferably selected so that it is much less than the diameter of the ball valve member so that during throttling the angle of deflection of the abrasive flow will be small. A purge fluid may be injected under pressure in spaces formed between the ball valve member and the body and inlet insert.

10 Claims, 4 Drawing Figures

½ CLOSED

B CLOSED

BALL VALVE FOR VALVING ABRASIVE FLUIDS

BACKGROUND AND SUMMARY OF THE INVENTION

The invention relates to the provision of a valve assembly that may be used to throttle and close off the flow of abrasive fluids. According to the invention, a ball valve member is provided having a tubular insert of abrasive-resistant material and a particular dimension, said insert providing surfaces for cutting off the flow of abrasive fluid through the valve. Tubular inserts of abrasive resistant material on either side of the ball valve member conduct fluid to and from the ball valve and cooperate with the valve member insert. The diameter of the passageway through the ball valve member insert is preferably relatively small compared to the diameter of the ball itself so that only a small angle of deflection is provided during throttling, which is important in reducing the abrasive action of the fluid. Also, a passageway may be provided between the ball valve and the body, and the ball valve and the inlet tubular insert whereby a purge fluid under a pressure higher than the pressure of fluid flowing through the valve may be injected in the passageways therebetween. There are many prior art teachings of valves having particular means associated therewith so that the valves may better withstand the action of fluids flowing therethrough, such as shown in U.S. Pat. Nos. 867,780; 885,526; 925,809; 3,073,336; and 3,825,030. Such valves often take the form of plug members formed entirely of ceramic material for resisting the corrosive action of fluid flowing therethrough, such as shown in U.S. Pat. Nos. 867,780; 885,526; and 925,809. The plug valves provide a cylindrical seat of relatively large area, thus large seating contact pressure is difficult to arrange, whereas in ball valves which seal in a seat of circular form, large contact pressure is easy to arrange. It is advantageous to provide the relatively rotatable parts of a valve of metal for proper operation, which provision is not suggested by the all-ceramic valves in the above-mentioned patents. Other prior patents which show ball valves provide plastic coatings therefor, such as U.S. Pat. Nos. 3,073,336 and 3,825,030. The coatings are provided on all wetted surfaces of the valves, and since coatings are provided a large range of materials with desirable properties are precluded from use therein, such as boron carbide.

In general, the prior art valves that are concerned with protection against fluid action are concerned with protection against corrosive chemical action of the fluid rather than the abrasive action of fluid. Therefore, such prior art valves in general have a very large angle of deflection during throttling. When abrasive fluids are to be valved, however, it is important to keep the angle of deflection as small as possible since the abrasive action of the fluid increases as the angle of deflection increases. This is accomplished by making the diameter of the passageway in the abrasive-resisting material insert much less than the diameter of the ball valve. Also, since tubular inserts are provided instead of coatings, a wide range of very abrasive-resistant materials that are not available in coating form — such as boron carbide — may be provided. Also, all wetted surfaces need not be formed of the abrasive-resistant material, whereas when chemical corrosion protection is desired all wetted surfaces must be formed of corrosion resistant material.

According to the present invention a ball valve assembly is provided including a main body portion having inlet and outlet bores therein, a generally spherical ball valve member in the body member and having a bore therethrough, tubular inserts of abrasive-resistant material provided in the bores, the tubular inserts having passageways therein, and the arcuate surfaces of the insert in the ball member having an arc length greater than the diameter of the passageways in the inlet and outlet inserts and the outlet insert having an arcuate portion of a length greater than or equal to the diameter of the passageway in the valve member insert. Also, the diameter of the ball compared to the diameter of the passageways is preferably selected so that the angle of deflection of the fluid during throttling is very small. Also, gaps are provided between the ball and the body and the ball and the inlet insert so that purge fluid under high pressure may be injected therein.

It is the primary object of this invention to provide a relatively inexpensive valve with improved abrasive-resisting properties for the throttling and valving of abrasive fluids. This and other objects of the invention will become clear upon an inspection of the detailed description of the invention and from the appended claims.

DETAILED DESCRIPTON OF THE INVENTION

Figure 1:
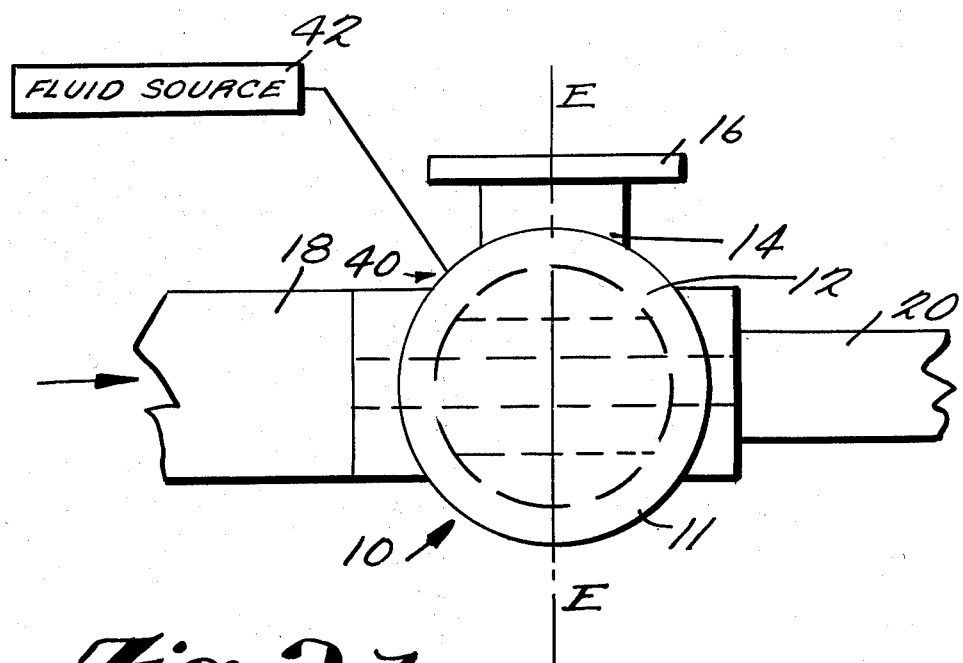
FIG. 1 is a side diagrammatic view of an exemplary abrasion-resisting ball valve assembly according to the present invention.

A ball valve assembly according to the present invention is shown generally at 10 in FIG. 1. The assembly 10 consists generally of a metal main body member 11, a ball valve member 12, a stem 14 extending upwardly from the member 12 to the exterior of the body 11, and a handle 16 or the like affixed to the end of the stem 14 for facilitating rotation of the valve member 12 within the body 11. Inlet and outlet pipes 18 and 20, of any suitable diameter, may be connected at either end to the valve body 11.

The valve body 11 has an inlet bore 22 and an outlet bore 24 formed therein, as well as a central chamber 26. Disposed in the inlet bore 22 is a tubular insert 28 of abrasion resistant material having a passageway 29 therein, and a similar insert 30 with a passageway 31 therein is provided in outlet bore 24. Mounted in the chamber 26 for rotation generally about axis E—E is a metal ball body 32 of valve member 12. The body 32 has a bore 33 formed therein which bore receives a tubular insert 34 of abrasion-resistant material. The insert 34 has a passageway 35 formed therein which passageway 35 is adapted to communicate with passageways 29 and 31 in inserts 28 and 30 respectively in the open position of the valve shown in FIG. 2a to allow a flow of fluid B therethrough. To provide for thermal expansion of the element 12 relative to the body 11 and insert 28, the ball 32 is loosely placed in the chamber 26, a clearance C being provided between the exterior surface of the ball 32 and the interior surface of body 11, and a clearance A being provided between the ball 32 and insert 34 thereof and the insert 28. It is noted, however, that portions of ball 32 and insert 34 contacting the outlet insert 30 are pressed into good contacting relationship therewith to block off the flow of abrasive fluid B through the assembly 10 in the position of the valve shown in FIG. 2c.

Since it is desirable to provide fluid passageways A and C, it is also desirable to provide a purge connection 40 in body 11. The purge connection 40 communicates with clearances A and C and is connected to a source of purge fluid under pressure, 42. Thus a purge fluid may be selectively injected into the areas defined by clearances A and C, the purge fluid being under a pressure slightly greater than the pressure or fluid in the abrasive flow B. Thus there is a constant leak of purge fluid from the connection 40, through clearance C, through clearance A, and entering the fluid stream B. The purge fluid protects the metal portions of the assembly 10 from the abrasive action of the fluid B.

The inserts 28, 30, and 34 may be formed of any suitable abrasion resistant material, such as ceramics. Other abrasion resistant materials include very hard metals such as chrome alloys, soft rubber materials, or abrasion resistant synthetic plastic materials, such as urethane. Suitable ceramics have been found to be aluminum oxide, silicon carbide, and boron carbide. Boron carbide is the hardest of these, being second only to diamonds in hardness among all materials, and therefore has the greatest potential for abrasion resistance, and is the preferred material to be used. It is noted that boron carbide is not available in coating form but is readily available in tubular form with relatively small bore-through compared to the wall thickness of the tube (and such tubes are relatively inexpensive), and therefore is eminently suited for use in the present invention. The insert 34 has a length D1 corresponding to the diameter D1 of the ball 32, and the passageway 35 has a diameter D2. The diameter D2 is small relative to the dimension D1, and relative to the thickness of the tube wall of insert 34, so that during throttling by the valve (see FIG. 2b) the angle of deflection of the flow B is relatively small, whereby the abrasive action of the fluid is minimized. For example, as shown in the drawings, the ratio of D1 to D2 is about 11 to 2, whereby the angle $\alpha$ through which the element 12 must be rotated to move the valve from the fully open position of FIG. 2a to the fully closed position of FIG. 2b is only about 20°. This compares with angles of about 70° in some prior art devices in the general field of the invention (see U.S. Pat. Nos. 925,809 and 3,073,336 for example). Also, it is important that the insert 34 walls be of great enough thickness so that the arcuate length $\beta$ of the portion thereof adapted to block the flow of fluid B (particularly the portion adjacent the inlet insert 28) is greater than or equal to the diameter of the passageway 29 in insert 28, and so that the arcuate portion $\gamma$ of insert 30 has a length greater than or equal to diameter D2 of passageway 35. It is preferred that the diameters of the passageways 29 and 31 also be D2, and that the wall thicknesses of the inserts 28, 30 correspond to the wall thickness of the insert 34. Thus it is seen that the inserts should be selected so that $\gamma = \beta$ D2, and so that D1 $\gg$ D2.

The inserts 28, 30, 34 may be affixed to the bores 22, 24, 33 by any suitable means to allow changing of the inserts when they are worn. The inserts may be cemented or glued to the metal parts with a suitable material such as ceramic paste or epoxy resin. To remove the worn inserts, the cement or glue is selectively attached; in the case of epoxy, heat could be applied (at a temperature beyond the temperature of rigidity of the resin) and the insert then merely pushed out, or selective attack by solvents may be utilized.

The stem area (14) is of course sealed, as by simple rotary stem packing arrangements, and the body 11 may be constructed in sections, or capped, for easy removal and insertion of member 12.

The invention having been described, a typical operation thereof will now be set forth. A valve member 12 is inserted in a casing 11, clearances A and C being provided between respective portions of the components. The body 11 has inlet and outlet ceramic inserts 28 and 30 affixed in bores 22 and 24 therein, as with glue or cement. Element 12 has an insert 34 of abrasion-resistant material affixed in bore 33 therein. The portion of insert 34 adjacent outlet insert 30 is pressed thereagainst to provide good sealing contact therewith. The relative dimensions of the inserts 28, 30 and 34 and the element 12 are selected so that $\gamma = \beta$ D2 and $\alpha$ is small. The source 42 of purge fluid under pressure may be connected up to connection 40, and a flow of purge fluid established in passages C and A.

Figure 2A:
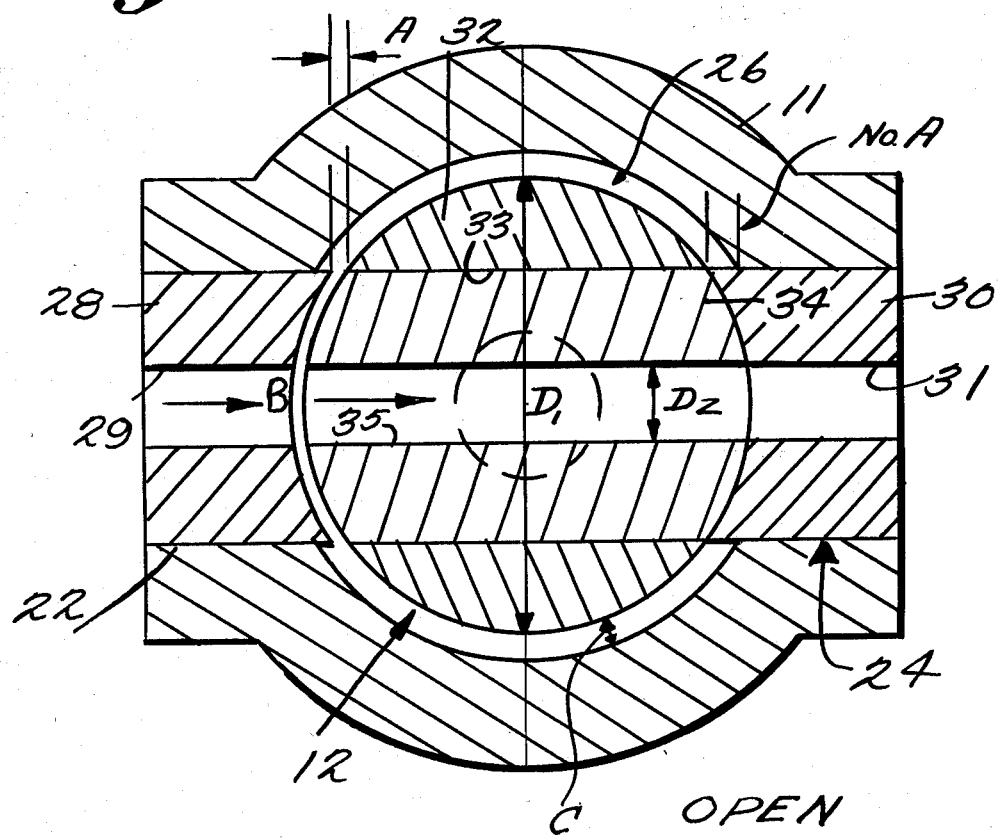
FIGS. 2a–2c are cross-sectional views taken along a plane generally perpendicular to the plane of the paper in FIG. 1 showing the ball valve of FIG. 1 in open, throttling, and closed positions respectively.
Figure 2B:
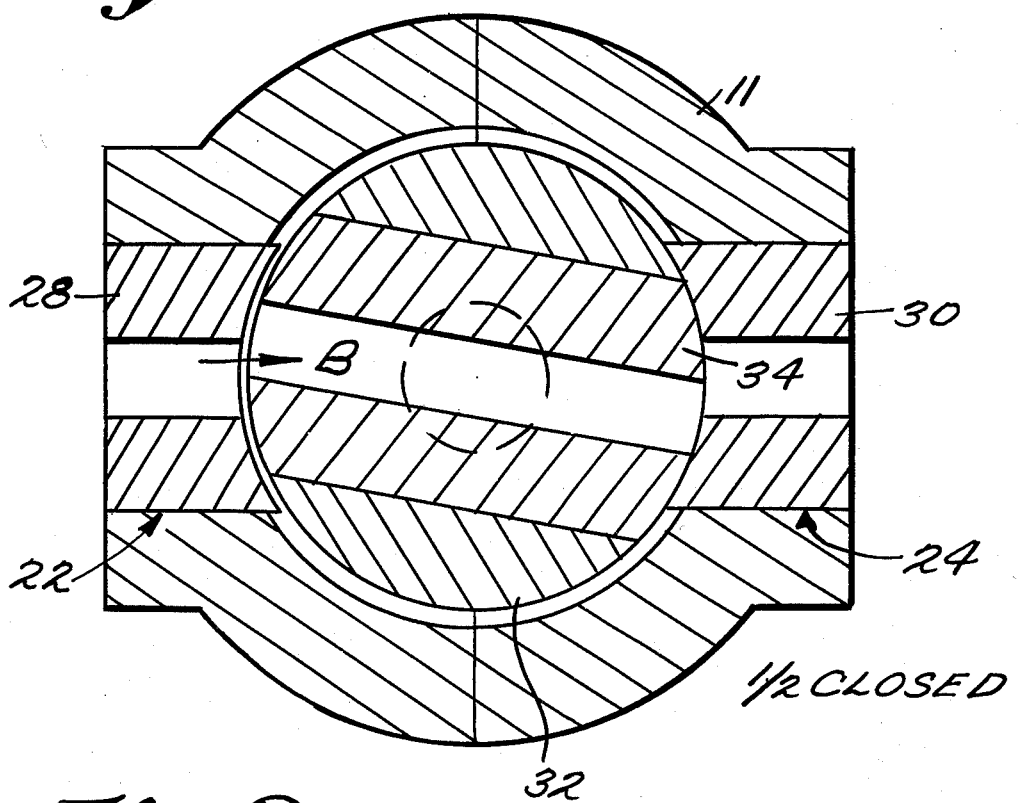
Figure 2C:
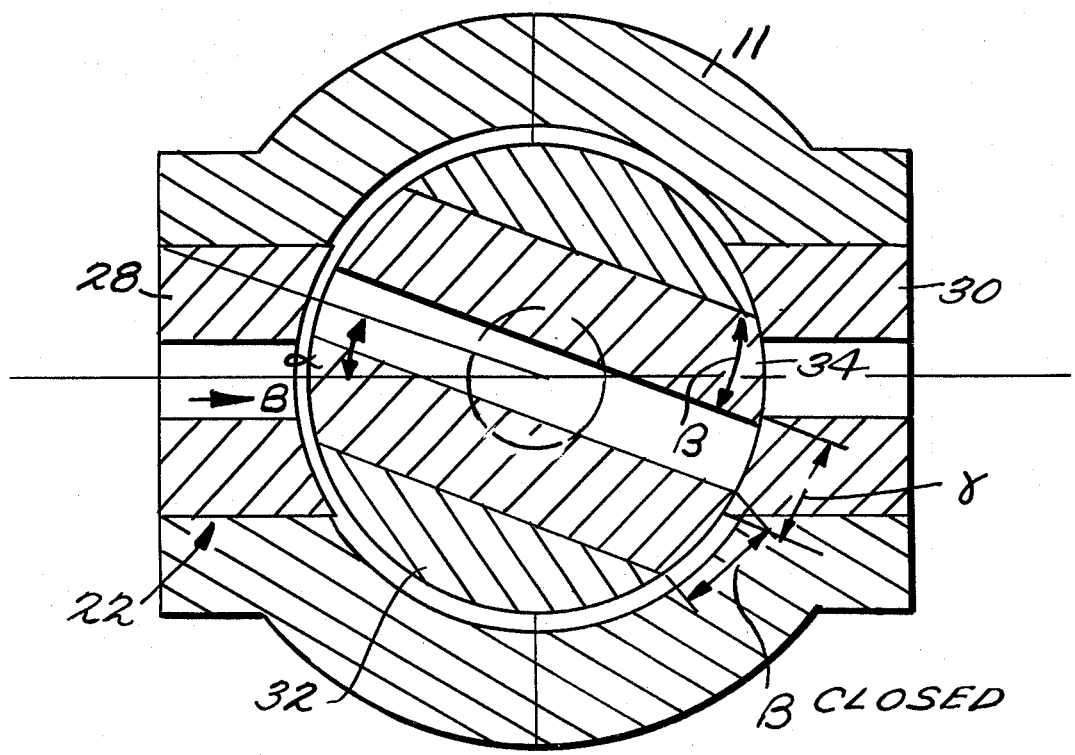

A flow of abrasive fluid B through inlet pipe 18 will thus pass through passageways 29, 35 and 31 in inserts 28, 34 and 30 respectively in the open position of the valve shown in FIG. 2a. When it is desired to throttle the flow, the stem 14 is rotated by handle 16 a small amount so that the valve assumes the position shown in FIG. 2b, and a throttled flow B continues through the passageways. Since the angle $\alpha$ is small, the angle of deflection of the flow B is small and therefore the abrasive action thereof is minimized. When it is desired to shut off the flow B, the valve is turned to its closed position wherein an arcuate section $\beta$ of the insert 34 is in sealing relationship with the portion $\gamma$ of insert 30 defining the opening of passageway 31. In this position of the valve the flow is effectively terminated, and only abrasive resistant parts are touched by the flow B during the valving operation.

It will thus be seen that a relatively inexpensive, abrasive flow resisting valve assembly has been provided. While the invention has been herein illustrated and described in what is presently conceived to be the most practical and preferred embodiment, it will be obvious to one of ordinary skill in the art that many modifications may be made thereof within the scope of the invention. For example, stops may be provided on stem 14 and body 11 for preventing rotation of member 12 with respect to body 11 to a position wherein metal portions of member 32 would be in the flow path B instead of insert sections. Other modifications are also possible thus it is intended that the present invention be accorded the full scope of the appended claims so as to encompass all equivalent structures and devices.

What is claimed is:

1. A ball valve assembly for valving abrasive fluids comprising
  a. a metal body member, said body member having an inlet bore, an outlet bore, and a generally spherical interior chamber adapted to receive a ball member,
  b. a generally spherical metal ball valve member contained in said body member interior chamber and rotatable about an axis with respect to said body member, said ball valve member having a bore therethrough,
  c. means for providing resistance of said valve assembly to deterioration by the action of abrasive fluids to be valved thereby, said means comprising (i) a tubular inlet insert located within said inlet body bore, said inlet insert having a passageway formed therethrough, (ii) a tubular valve member insert located in said ball valve member bore, said valve member insert having a passageway formed therethrough, (iii) a tubular outlet insert located within said body outlet bore, said outlet insert having a passageway formed therethrough, each of said inserts being formed of abrasion-resistant material, d. means for rotating said valve member with respect to said body member from an open position wherein said passageways are aligned and fluid may flow therethrough, through a throttling position, to a closed position wherein portions of said valve member insert block the passage of fluid from said inlet insert passageway to said valve member passageway and portions of said valve member insert and portions of said outlet insert block the passage of fluid from said valve member insert passageway to said outlet insert passageway, and e. said valve member insert having arcuate sections formed at the ends thereof adjacent said outlet insert and said inlet insert, the arcuate section of said valve member insert adjacent said inlet insert having a length greater than or equal to the diameter of the inlet insert passageway and the arcuate section of said valve member insert adjacent said outlet insert cooperating with an arcuate section of said outlet insert which has a length greater than the diameter of the valve member insert passageway.

2. An assembly as recited in claim 1 wherein said abrasion resistant material is selected from the group consisting of ceramic material, hard metals, soft rubber material, and abrasion resistant synthetic plastic material.

3. An assembly as recited in claim 2 wherein said abrasion resistant material is a ceramic material, and wherein said ceramic material is selected from the group consisting of boron carbide, silicon carbide, and aluminum oxide.

4. An assembly as recited in claim 1 wherein the arcuate end section of said valve member insert adjacent said outlet insert is pressed into sealing engagement therewith, and wherein the arcuate end section of said valve member insert adjacent said inlet insert is spaced from said inlet insert a small distance.

5. An assembly as recited in claim 4 wherein a clearance is provided between said ball valve member and said body member to allow for thermal expansion of said valve member.

6. An assembly as recited in claim 5 further comprising a purge fluid connection on said body member in fluid communication with the clearance between said ball valve member and said body member and the space between said valve member insert and said inlet insert, said purge fluid connection adapted to be connected to a source of purge fluid under pressure.

7. An assembly as recited in claim 1 wherein the diameter of said passageways is D2 and wherein the diameter of said generally spherical ball member is D1, and wherein D1 is substantially greater than D2 so that the angle of deflection of abrasive fluid during throttling is small.

8. An assembly as recited in claim 1 wherein said means for rotating said valve member comprises a valve stem extending from said valve member through said body member, said valve stem being sealed with respect to said body member.

9. An assembly as recited in claim 1 wherein each of said tubular inserts has walls of the same thickness, and wherein the diameters of each of said passageways is the same.

10. An assembly as recited in claim 1 further comprising means for removably affixing said inserts within said bores so that said inserts may be replaced when worn.

* * * * *